US011981551B2

United States Patent
Paul et al.

(10) Patent No.: US 11,981,551 B2
(45) Date of Patent: May 14, 2024

(54) TRANSMISSION REMOVER AND INSTALLER

(71) Applicants: Wendy Paul, Aztec, NM (US); Ryan Paul, Aztec, NM (US)

(72) Inventors: Wendy Paul, Aztec, NM (US); Ryan Paul, Aztec, NM (US)

( * ) Notice: Subject to any disclaimer, the term of this patent is extended or adjusted under 35 U.S.C. 154(b) by 22 days.

(21) Appl. No.: 17/585,534

(22) Filed: Jan. 26, 2022

(65) Prior Publication Data

US 2022/0234874 A1 Jul. 28, 2022

Related U.S. Application Data

(60) Provisional application No. 63/141,490, filed on Jan. 26, 2021.

(51) Int. Cl.
*B66F 13/00* (2006.01)
*B25B 27/02* (2006.01)
*F16H 57/00* (2012.01)

(52) U.S. Cl.
CPC ............ *B66F 13/00* (2013.01); *B25B 27/023* (2013.01); *F16H 2057/0062* (2013.01)

(58) Field of Classification Search
CPC ... B25B 27/0064; B25B 27/023; B66F 13/00; F16H 2057/0062; F16H 57/00; F16D 2300/12
USPC .......................................................... 29/256
See application file for complete search history.

(56) References Cited

U.S. PATENT DOCUMENTS

| 1,123,513 | A | * | 1/1915 | Gaillard | ................ | B25B 27/023 |
| | | | | | | 29/261 |
| 2,359,099 | A | * | 9/1944 | Fechner | ................ | B25B 27/023 |
| | | | | | | 29/256 |
| 4,989,312 | A | * | 2/1991 | Maddalena | ........... | B25B 27/023 |
| | | | | | | 29/259 |
| 5,209,623 | A | * | 5/1993 | Krehnovi | .............. | B25B 27/023 |
| | | | | | | 411/533 |

(Continued)

FOREIGN PATENT DOCUMENTS

CN  113172577 A * 7/2021

OTHER PUBLICATIONS

Clutch Tech: Dual-Clutch Transmission Clutch Assembly Removal and Installation Tools found at: https://www.youtube.com/watch?v=uSulfc6zuao (Year: 2016).*

(Continued)

*Primary Examiner* — Mahdi H Nejad
(74) *Attorney, Agent, or Firm* — Thrasher Associates

(57) ABSTRACT

Disclosed is a transmission remover and installer, for removing and installing transmissions, which comprises a plate defined by a top surface and bottom surface; a connecting means at a first end of the plate traversing through a hole in the plate, installed using a first securing means on the top surface and a second securing means on the bottom surface of the plate; a mounting means securing the top of the connecting means using a first protrusion located at the bottom of the mounting means; and a jack adapter coupled at the bottom surface at a second end of the plate. The mounting means has a first hole and a second hole configured to couple with a transmission after identifying a balance point of the transmission and the jack adapter has a coupling means enabling the jack adapter to be coupled with a jack after identifying a balance point.

2 Claims, 5 Drawing Sheets

(56) References Cited

U.S. PATENT DOCUMENTS

| | | | | |
|---|---|---|---|---|
| 5,621,957 A | * | 4/1997 | Herrera | F41B 5/1465 |
| | | | | 29/264 |
| 2012/0036689 A1 | * | 2/2012 | Sjosten | B25B 27/0064 |
| | | | | 29/256 |
| 2013/0067745 A1 | * | 3/2013 | Musuraca | F16H 57/023 |
| | | | | 29/256 |
| 2023/0202008 A1 | * | 6/2023 | Neto | B25B 27/0035 |
| | | | | 29/245 |

OTHER PUBLICATIONS

HCBSpecialtytools H.C.B-A1847 Ford Powershift Transmission Dual Clutch Remover/Installer Fixture Kit https://www.youtube.com/watch?v=EollkgZ9UIU (Year: 2018).*

* cited by examiner

TRANSMISSION REMOVER AND INSTALLER

CLAIM OF PRIORITY, IDENTIFICATION OF RELATED APPLICATIONS

This Non-Provisional patent application is related to and claims priority from U.S. Provisional Patent Application No. 63/141,490 filed on Jan. 26, 2021 entitled "Wrestle Not Transmission Remover and Installer" to common inventor Wendy Paul.

TECHNICAL FIELD

The invention generally relates to jacks, and more specifically to attachments for jacks used in automobile repair.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem

Repairing a transmission often requires removing the transmission. Taking out a transmission and putting in a repaired (or new) transmission is difficult. Indeed, removing a transmission and placing a repaired or new transmission in its place can require two jacks and a lot of human strength. Further, there is no jack attachment for lifting transmissions such that they do not slip or drop.

Therefore, there is a need for a transmission remover and installer that addresses the aforesaid drawbacks. The present invention provides such a solution.

SUMMARY

The above objective is solved by a transmission remover and installer comprising features of the claims. The transmission remover and installer comprises a plate defined by a top surface and bottom surface, a connecting means at a first end of the plate traversing through a hole in the plate, installed using a first securing means on the top surface and a second securing means on the bottom surface of the plate and a mounting means securing the top of the connecting means using a first protrusion located at the bottom of the mounting means. In various embodiments, the first protrusion is a hollow cylindrical protrusion whose inner wall has threads to secure the connecting means in the mounting means. Alternatively, the first protrusion is a hollow cylindrical protrusion that is snap-fitted to the connecting means. The mounting means has a first hole and a second hole configured to couple with a transmission after identifying a balance point of the transmission.

The transmission remover and installer further comprises a jack adapter coupled at the bottom surface at a second end of the plate, wherein a coupling means at under-side of the jack adapter is configured to enable the jack adapter to be coupled with a jack after identifying a balance point. In various embodiments, the jack adapter is coupled to a sub-plate having at least two slots, where the sub-plate is further coupled to the bottom surface of the plate. The at least two slots are configured to receive a plurality of connecting means protruding out of the plate so that a plurality of securing means is placed to secure the plurality of connecting means and adjusted where needed to balance on a jack at underside to a second end of the plate.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT

Interpretation Considerations

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The present invention discloses a transmission remover and installer that is cost effective, quick and easy to use as compared to the existing solutions.

Figure 1:
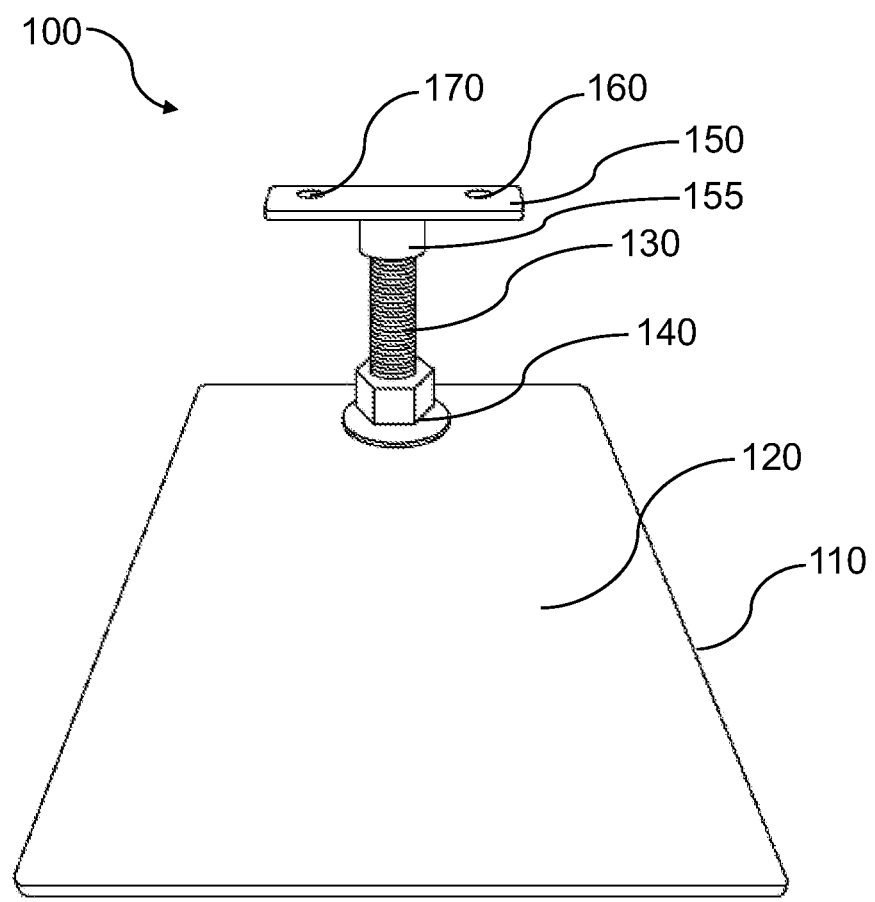
FIG. 1 is a front perspective view of a transmission remover and installer.
Figure 2:
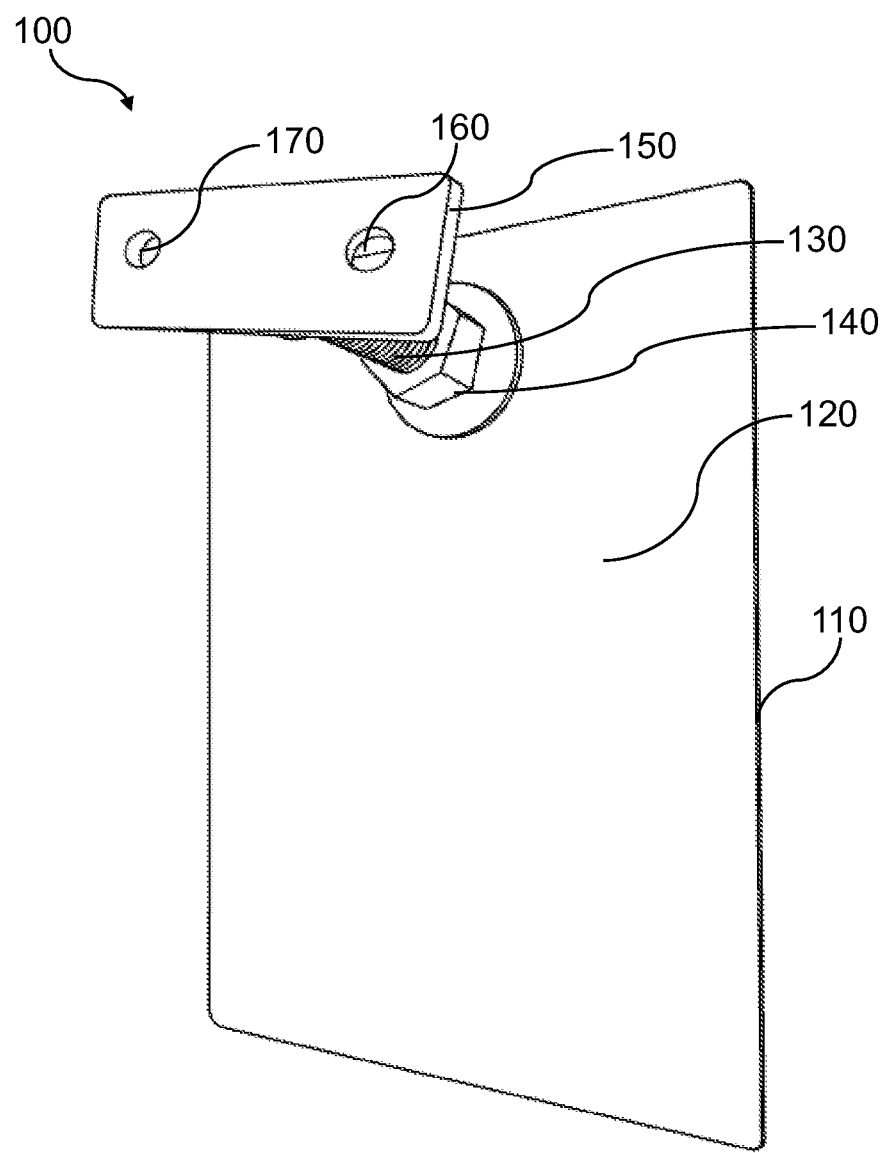
FIG. 2 is a top perspective view of the transmission remover and installer.
Figure 3:
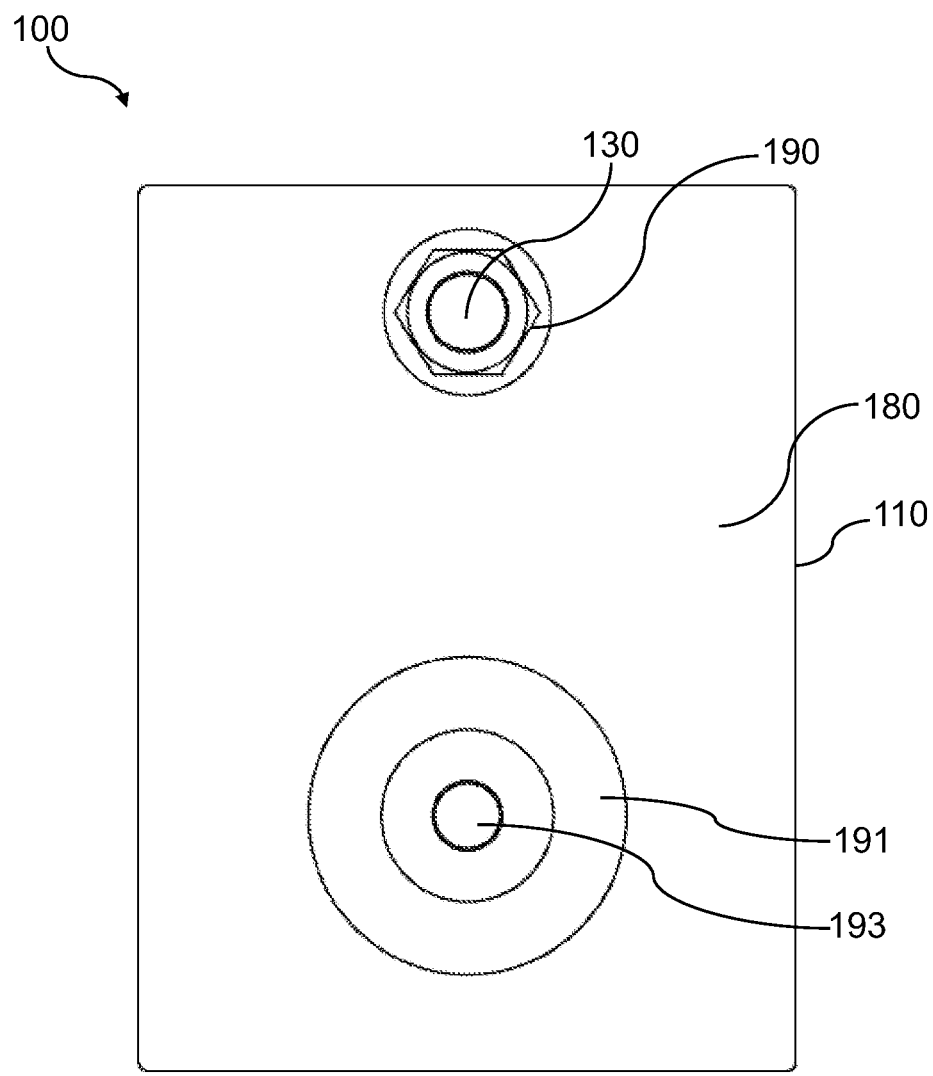
FIG. 3 is a bottom view of the transmission remover and installer.
Figure 4:
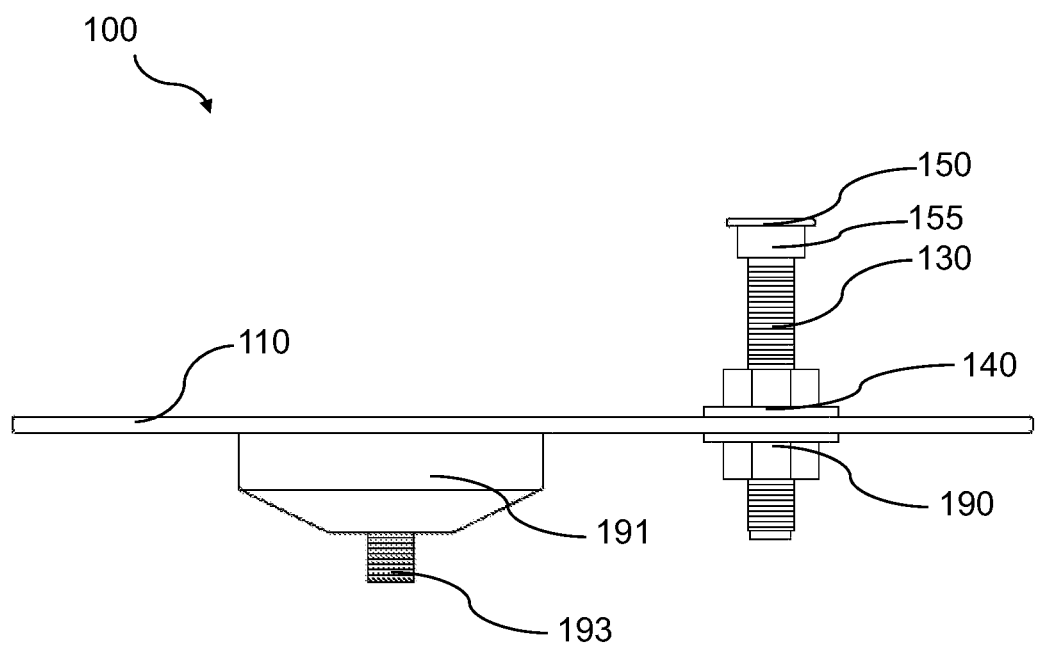
FIG. 4 is a side view of the transmission remover and installer.

In opening, simultaneous reference is made to FIG. 1 through FIG. 4, in which FIG. 1 is a front perspective view of a transmission remover and installer (aka "jack attachment") 100, FIG. 2 is a top perspective view of the transmission remover and installer 100, FIG. 3 is a bottom view of the transmission remover and installer 100 and FIG. 4 is a side view of the transmission remover and installer 100.

The transmission remover and installer 100 is a flat plate (aka "plate") 110 defined by a top surface 120 (shown in FIG. 1 and FIG. 2) and a bottom surface 180 (as shown in FIG. 3). The plate 110 has a rectangular shape, a square shape, for example and made of materials like aluminium, steel or other suitable metals or combination of metals, for example. The plate 110 is characterized by a width, a length and a thickness. The width of the plate 110 is in a range between 10 centimetres and 40 centimetres, the length of the plate 110 is in a range between 20 centimetres and 50 centimetres and the thickness of the plate 110 is in a range between 2 centimetres and 10 centimetres.

The transmission remover and installer 100 comprises a connecting means 130 at one end ("first end") of the plate 110, which traverses through a hole in the plate 110 and is installed/fixed using a first securing means 140 on the top surface 120 (as shown in FIG. 1 and FIG. 2) and a second securing means 190 on the bottom surface 180 (as shown in FIG. 3) of the plate 110. The hole may be an oblong hole, for example. The connecting means 130 is adjustable as per requirement and is slightly larger than other connecting means used in the present invention. The connecting means 130 is a bolt, a threaded bolt, for example and the first securing means 140 and the second securing means 190 are a nut. Of course, other connecting means and securing means are known, foreseeable, and unforeseeable, and each of these is readily apparent to those of skill in the art upon reading this disclosure.

At the top of the connecting means 130, a mounting means 150 is secured. The mounting means 150 has a first protrusion 155 at its bottom mid-section that allows the mounting means 150 to secure/receive the connecting means 130. The first protrusion 155 is a hollow cylindrical protrusion, for example. Inner diameter/wall of the first protrusion 155 has threads to secure the connecting means 130 in the mounting means 150. Alternatively, the mounting means 150 may be snap-fitted to the connecting means 130. Alternatively, the mounting means 150 may be welded at/to the connecting means 130. The mounting means 150 has at least a rectangular shape, a square shape, for example. The mounting means 150 is a piece of flat metal (such as aluminium, steel, for example) with a first hole 160 and a second hole 170 configured to attach a transmission (not shown). The first hole 160 and the second hole 170 may be an oblong hole, a slotted hole, for example. By identifying a balance point of the transmission, the transmission remover and installer 100 is coupled with the transmission using the mounting means 150 for removing and installing the transmission.

The transmission remover and installer 100 further comprises a jack adapter 191 having a coupling means 193 at under-side (i.e., bottom surface 180) to another end ("second end") of the plate 110 as shown in FIG. 3 and FIG. 4. The jack adapter 191 is directly attached to the bottom surface 180 of the plate 110 and the coupling means 193 is configured to enable the jack adapter 191 to be coupled with a jack (not shown) after identifying a balance point. The jack may be a floor jack, for example, which is converted into a transmission jack using the jack adapter 191. The coupling means 193 may or may not have threads formed on it.

Figure 5:
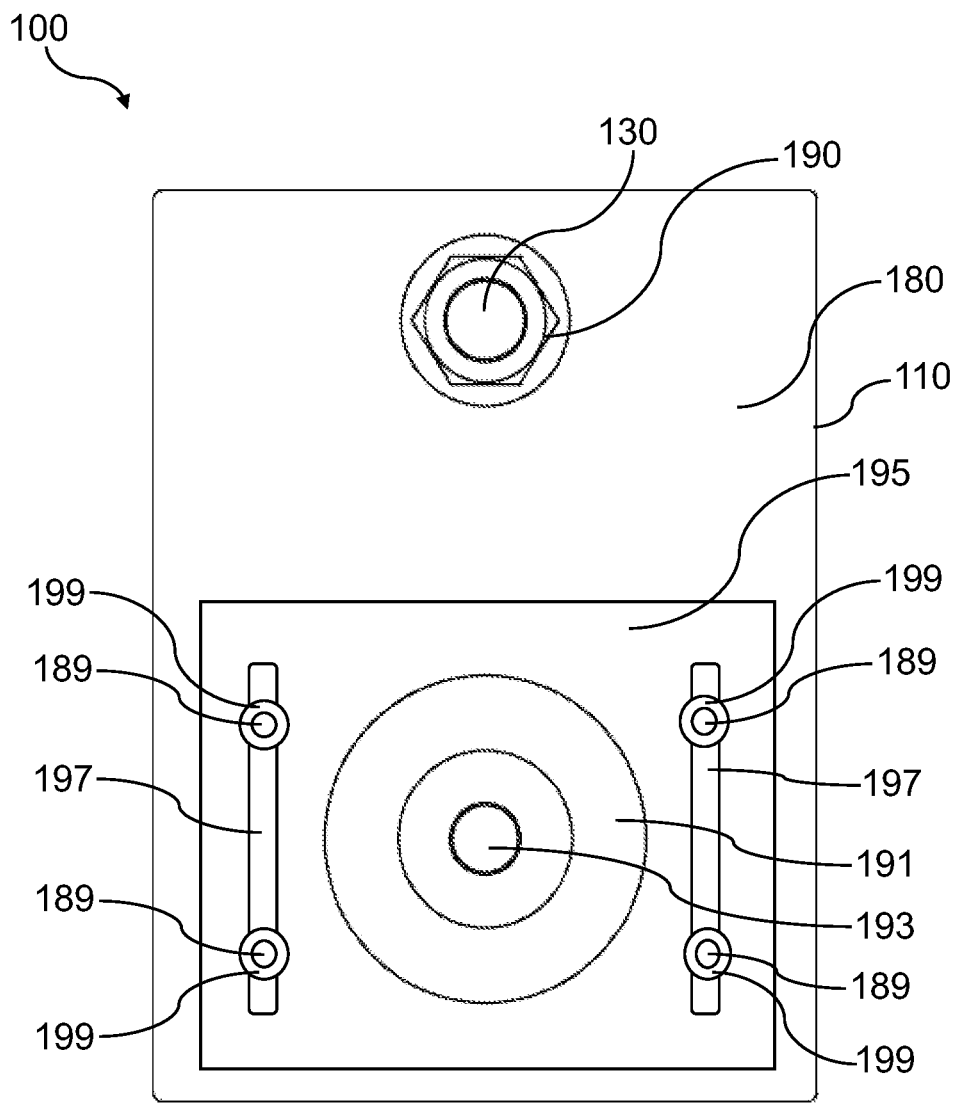
FIG. 5 is a bottom view of an alternate transmission remover and installer.

Alternatively, as shown in FIG. 5, the jack adapter 191 is coupled to a sub-plate 195 having at least two slots 197, where the sub-plate 195 is further coupled to the bottom surface 180 of the plate 110. The sub-plate 195 is sandwiched between the jack adapter 191 and the plate 110. The sub-plate 195 has a rectangular shape, a square shape, for example and made of materials like aluminium, steel or other suitable metals or combination of metals, for example. The sub-plate 195 is characterized by a width, a length and a thickness. The width of the sub-plate 195 is in a range between 5 centimetres and 30 centimetres, the length of the sub-plate 195 is in a range between 5 centimetres and 30 centimetres and the thickness of the sub-plate 195 is in a range between 2 centimetres and 10 centimetres.

In various embodiments, the at least two slots 197 are configured to receive a plurality of connecting means 189 protruding out of the plate 110. Such an arrangement of the at least two slots 197 and the plurality of connecting means 189 protruding out of the plate 110 allows the sub-plate 195 to be slidable on the plate 110. The plurality of connecting means 189 is protruding out of the plate 110 by traversing the sub-plate 195, where a plurality of securing means 199 may be placed (to secure the plurality of connecting means 189) and adjusted where needed to balance on the jack at the underside to the other end of the plate 110. In an example, the plurality of connecting means 189 includes four bolts with threads and the plurality of securing means 199 includes four nuts respectively. Of course, other connecting means and securing means are known, foreseeable, and unforeseeable, and each of these is readily apparent to those of skill in the art upon reading this disclosure.

It may be noted that although the present invention shows various elements of the transmission remover and installer 100, but it is to be understood that other alternatives are not limited thereon. Further, the labels or names of the elements/components are used only for illustrative purpose and do not limit the scope of the present invention. The shape and size of the various elements in the transmission remover and installer 100 do not limit the scope of the present invention.

Unless otherwise defined, all technical and scientific terms used herein have the same meaning as commonly understood by one of ordinary skill in the art to which this invention belongs. Although methods and materials similar to or equivalent to those described herein can be used in the practice or testing of equivalent systems and methods, suitable systems and methods and are described above.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

TABLE

LIST OF REFERENCE NUMERALS

| Reference Numeral | Element Name |
| --- | --- |
| 100 | Transmission remover and installer |
| 110 | Plate |
| 120 | Top surface |
| 130 | Connecting means |
| 140 | First securing means |
| 150 | Mounting means |
| 155 | First protrusion |
| 160 | First hole |
| 170 | Second hole |
| 180 | Bottom surface |
| 189 | Plurality of connecting means |
| 190 | Second securing means |
| 191 | Jack adapter |
| 193 | Coupling means |
| 195 | Sub-plate |
| 197 | At least two slots |
| 199 | Plurality of securing means |

What is claimed is:

1. A transmission remover and installer for removing and installing transmissions, comprising:
   a plate defined by a top surface and bottom surface;
   a connecting means at a first end of the plate traversing through a hole in the plate, installed using a first securing means on the top surface and a second securing means on the bottom surface of the plate;
   a mounting means securing the top of the connecting means using a first protrusion located at the bottom of the mounting means; and
   a jack adapter coupled at the bottom surface at a second end of the plate, wherein a coupling means at underside of the jack adapter is configured to enable the jack adapter to be coupled with a jack,
   the jack adapter is coupled to a sub-plate having at least two slots, where the sub-plate is further coupled to the bottom surface of the plate, and the sub-plate has at least a rectangular shape, a square shape and made of a metal.

2. A transmission remover and installer for removing and installing transmissions, comprising:
   a plate defined by a top surface and bottom surface;
   a connecting means at a first end of the plate traversing through a hole in the plate, installed using a first securing means on the top surface and a second securing means on the bottom surface of the plate;
   a mounting means securing the top of the connecting means using a first protrusion located at the bottom of the mounting means; and
   a jack adapter coupled at the bottom surface at a second end of the plate, wherein a coupling means at underside of the jack adapter is configured to enable the jack adapter to be coupled with a jack, and the mounting means has a first hole and a second hole configured to couple with a transmission after identifying a balance point of the transmission.

* * * * *